(12) United States Patent
Vanover (10) Patent No.: US 11,305,619 B1
(45) Date of Patent: Apr. 19, 2022

(54) THREE-IN-ONE WINDSHIELD (71) Applicant: Super ATV, LLC, Madison, IN (US)

(72) Inventor: Justin Vanover, Holton, IN (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 17/452,845

(22) Filed: Oct. 29, 2021

(51) Int. Cl.
*B60J 1/06* (2006.01)
*B60J 10/72* (2016.01)

(52) U.S. Cl.
CPC ............ *B60J 1/06* (2013.01); *B60J 10/72* (2016.02); *B60Y 2200/124* (2013.01); *B60Y 2200/20* (2013.01)

(58) Field of Classification Search
CPC ....... B60J 1/06; B60J 10/72; B60Y 2200/124; B60Y 2200/20
USPC ......... 296/77.1, 84.1, 86, 87, 88, 89, 91, 92, 296/96.11, 96.13, 96.21
See application file for complete search history.

(56) References Cited

U.S. PATENT DOCUMENTS

| | | | | | |
|---|---|---|---|---|---|
| 3,958,826 | A * | 5/1976 | Upton | ................. | B60J 1/04 296/77.1 |
| 4,792,175 | A * | 12/1988 | Gerber | ................. | B60J 1/06 280/DIG. 5 |
| 5,195,797 | A * | 3/1993 | Hobbs | ................. | B60J 1/04 280/DIG. 5 |
| 5,385,380 | A * | 1/1995 | Heavner | ................. | B60J 1/04 280/DIG. 5 |
| 5,791,720 | A * | 8/1998 | Moore | ................. | B60J 1/06 24/336 |
| 6,206,447 | B1 * | 3/2001 | Nation | ................. | A63B 55/61 296/77.1 |
| 7,380,860 | B2 * | 6/2008 | Dolan | ................. | B60J 10/30 296/84.1 |
| 8,936,296 | B1 * | 1/2015 | Fedders | ................. | B60J 1/06 296/85 |
| 2006/0249975 | A1 * | 11/2006 | Bruntz | ................. | B60J 1/06 296/77.1 |
| 2009/0230714 | A1 * | 9/2009 | Reese | ................. | B60J 1/06 296/92 |
| 2009/0278373 | A1 * | 11/2009 | Rouzer | ................. | B60J 1/06 296/92 |
| 2011/0254314 | A1 * | 10/2011 | Renard | ................. | B60J 1/04 296/190.1 |
| 2015/0043051 | A1 * | 2/2015 | Woodrow | ................. | G02F 1/0126 359/241 |

\* cited by examiner

*Primary Examiner* — Hilary L Gutman
(74) *Attorney, Agent, or Firm* — Woodard, Emhardt, Henry, Reeves & Wagner, LLP (57) ABSTRACT

A windshield assembly for an off-road vehicle includes a pair of windshield members that may be configured without tools to adopt multiple configurations, including:
  a) a first configuration that is a full windshield configuration in which the windshield extends substantially from the hood of the vehicle to the roof of the vehicle, thus providing full coverage for the cockpit;
  b) a second configuration that is a flip-down windshield configuration in which the upper portion of the windshield is flipped downward and/or forward, thus providing airflow into the cockpit; and
  c) a third configuration that is a half windshield configuration in which the upper portion of the windshield has been detached and removed from the lower portion, thus leaving only a half windshield to protect the cockpit.

6 Claims, 7 Drawing Sheets

THREE-IN-ONE WINDSHIELD

FIELD OF THE INVENTION

The present invention relates generally to off-road vehicles, and more particularly to windshields for off-road vehicles such as all-terrain vehicles (ATVs) and utility task vehicles (UTVs).

BACKGROUND TO THE INVENTION

Off road vehicles typically have a cage to protect the occupants from injury if the event of a rollover. In some cases, the cage may support accessories such as a windshield or a roof to protect the occupants from wind and rain while riding.

Off-road vehicle windshields typically come in one of several configurations, namely, full windshields that extend from the hood to the roof and protect the occupants most completely, half windshields that extend upward from the hood a short distance such as six- to twelve inches, and flip windshields.

A need exists for a windshield assembly that can be adapted to whatever configuration is demanded by the environment at hand. The present invention address that need.

SUMMARY OF THE INVENTION

One aspect of the present invention provides a windshield assembly for an off-road vehicle. The windshield may comprise a first windshield member, and a second windshield member. The first- and second windshield members may be configured without tools to adopt any of three configurations, namely:
  a) a first configuration that is a full windshield configuration in which the windshield extends substantially from the hood of the vehicle to the roof of the vehicle, thus providing full coverage for the cockpit;
  b) a second configuration that is a flip-down windshield configuration in which the upper portion of the windshield is flipped downward and/or forward, thus providing airflow into the cockpit; and
  c) a third configuration that is a half windshield configuration in which the upper portion of the windshield has been detached and removed from the lower portion, thus leaving only a half windshield to protect the cockpit.

In a preferred embodiment the first windshield member comprises a fixed lower portion, and the second windshield member comprises a movable upper portion. In that embodiment the movable upper portion is movable to any of three configurations, namely:
  a) a first, upright configuration in which the movable/removable upper portion extends upward from the upper edge of the fixed lower portion to the top of the vehicle, thus providing full coverage for the cockpit;
  b) a second, flipped-down configuration in which the movable/removable upper portion is flipped downward and/or forward from the upper edge of the fixed lower portion to the hood of the vehicle, thus providing airflow into the cockpit; and
  c) a third, half-windshield configuration in which the movable/removable upper portion is detached and removed from the fixed lower portion, leaving only the fixed lower portion of the windshield.

In some embodiments the windshield assembly further includes a hinge for facilitating movement of the movable upper portion from its first, upright position to its second, lowered position, and for facilitating detachment of the movable upper portion from the fixed lower portion. In some embodiments the hinge is adapted to facilitate detachment of the movable upper portion from the fixed lower portion without the need for any tools. In some embodiments the hinge comprises a pivot shaft. In still further embodiments the hinge is adapted to facilitate detachment of the movable upper portion from the fixed lower portion by aligning a key with a key slot on the pivot shaft, allowing for translation off of the shaft.

DESCRIPTION OF THE DRAWINGS

FIGS. 1-17 show various embodiments and features of the three-in-one windshield of the present invention.

WRITTEN DESCRIPTION

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, one aspect of the present invention relates to a windshield assembly for an off-road vehicle. The windshield may comprise a first windshield member and a second windshield member. The first- and second windshield members may be configured without tools to adopt any of three configurations, namely:
  a) a first configuration that is a full windshield configuration in which the windshield extends substantially from the hood of the vehicle to the roof of the vehicle, thus providing full coverage for the cockpit;
  b) a second configuration that is a flip-down windshield configuration in which the upper portion of the windshield is flipped downward and/or forward, thus providing airflow into the cockpit; and
  c) a third configuration that is a half windshield configuration in which the upper portion of the windshield has been detached and removed from the lower portion, thus leaving only a half windshield to protect the cockpit.

In a preferred embodiment the inventive windshield comprises a fixed lower portion, and the second windshield member comprises a movable/removable upper portion. In that embodiment the movable/removable upper portion can be moved to any of three configurations, namely:
  a) a first, upright configuration in which the movable/removable upper portion extends upward from the upper edge of the fixed lower portion to the top of the vehicle, thus providing full coverage for the cockpit;
  b) a second, flipped-down configuration in which the movable/removable upper portion is flipped downward and/or forward from the upper edge of the fixed lower portion to the hood of the vehicle, thus providing airflow into the cockpit; and
  c) a third, half-windshield configuration in which the movable/removable upper portion is detached and removed from the fixed lower portion, leaving only the fixed lower portion of the windshield.

In some embodiments the windshield assembly further includes a hinge assembly for facilitating movement of the movable upper portion from its first, upright position to its second, lowered position, and for facilitating detachment of the movable upper portion from the fixed lower portion. The hinge may be adapted to facilitate detachment of the movable upper portion from the fixed lower portion without the need for any tools. For example, the hinge may comprise a first portion with a pivot shaft having a key end portion, and a second portion with a slot that matches and is alignable with the key end portion. The first portion may be installed on the fixed, lower portion of the windshield, and the second portion may be installed on the movable/removable upper portion of the windshield. When the windshield is in either its first, upright configuration in which the movable/removable upper portion extends upward from the upper edge of the fixed lower portion to the top of the vehicle, or its second, flipped-down configuration in which the movable/removable upper portion is flipped downward and/or forward from the upper edge of the fixed lower portion to the hood of the vehicle, the key end and the key slot are not aligned and the upper windshield portion may not be detached and removed from the lower windshield portion. When the windshield is in a third (preferably intermediate) position, and the key end and the key slot are aligned, the upper windshield portion may be slid sideways and detached/removed from the lower windshield portion.

Referring now to the drawings, FIGS. 1-18 show various embodiments and features of the three-in-one windshield of the present invention.

Figure 1:
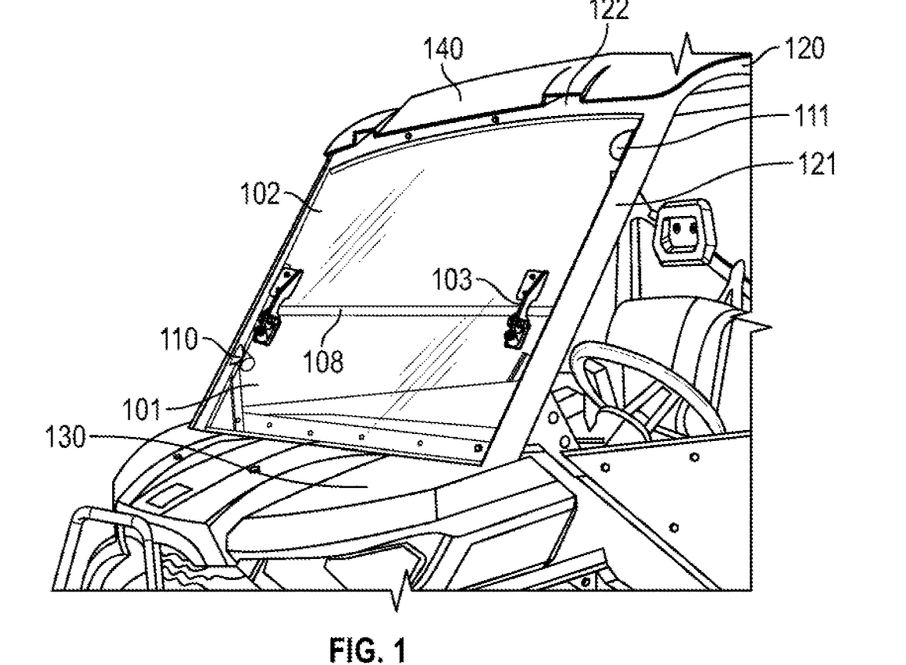
FIG. 1 shows one embodiment of the three-in-one windshield of the present invention in an upright configuration in which the movable/removable upper portion extends upward from the upper edge of the fixed lower portion to the top of the vehicle, thus providing full coverage for the cockpit.

FIG. 1 shows one embodiment of the three-in-one windshield of the present invention in an upright "full windshield" configuration. In the illustrated embodiment, fixed lower portion 101 is mounted to the vehicle, using clips 110, and upper movable/removable portion 102 is attached to fixed lower portion 101 with hinge assembly 103. The upper movable/removable portion 102 is positioned in its full, upright position, where it may be attached to A-pillar 121 with clips 111. When so configured, the windshield extends from hood 130 to roof 140, thus providing full coverage for the cockpit.

Figure 2:
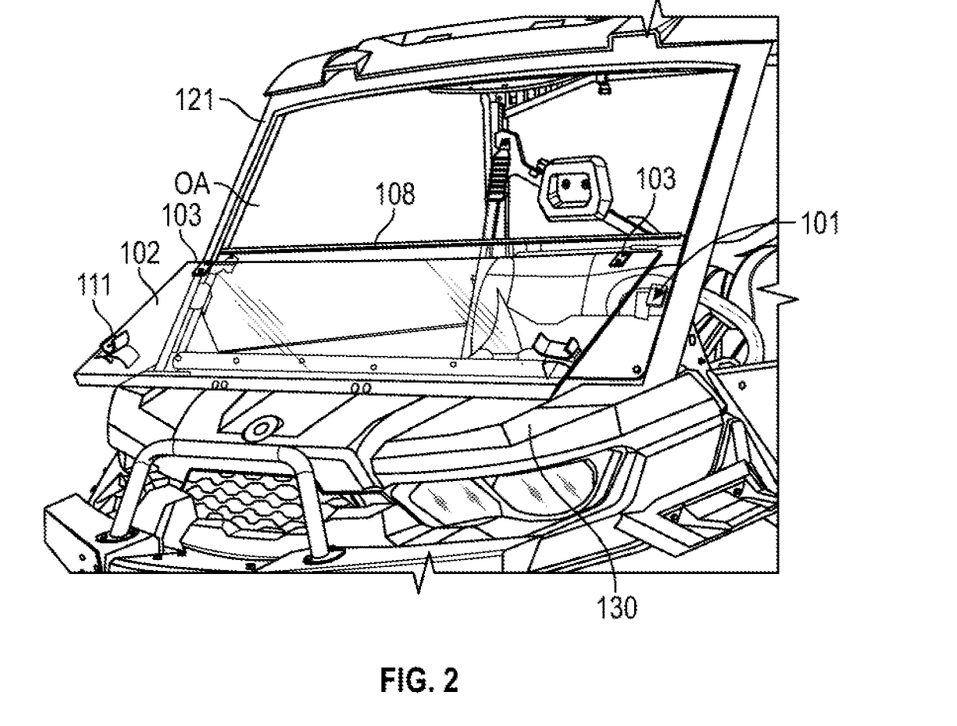
FIG. 2 shows one embodiment of the three-in-one windshield of the present invention in a flipped-down configuration in which the movable/removable upper portion is flipped downward and/or forward from the upper edge of the fixed lower portion to the hood of the vehicle, thus providing airflow into the cockpit.

FIG. 2 shows one embodiment of the three-in-one windshield of the present invention in a flipped-down configuration in which the movable/removable upper portion is flipped downward and/or forward from the upper edge of the fixed lower portion to the hood of the vehicle, thus providing airflow into the cockpit. In the illustrated embodiment, the upper clips 111 have been released, and upper movable/removable portion 102 has been flipped downward and/or forward from the upper edge of the fixed lower portion to the hood of the vehicle, thus providing good airflow to the cockpit through open area OA.

Figure 3:
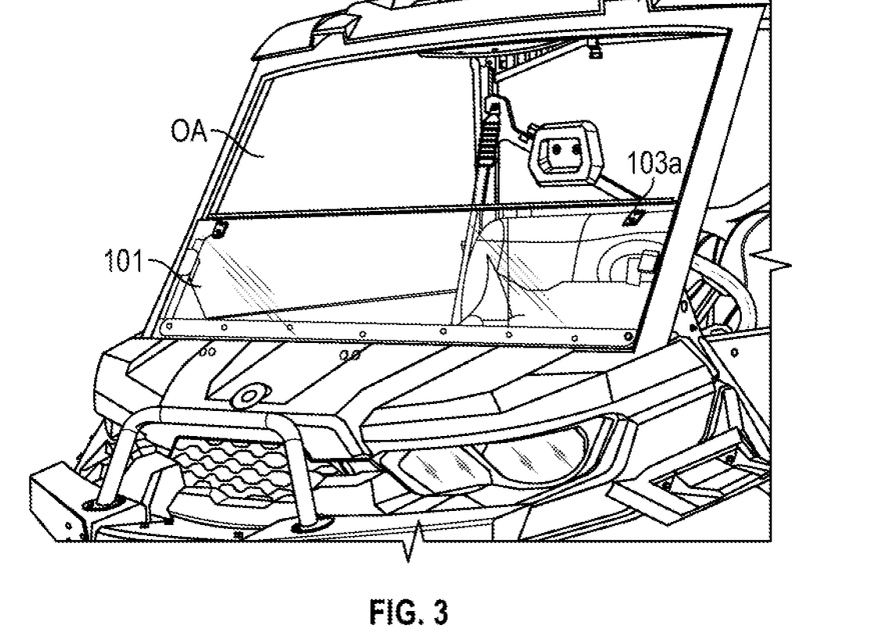
FIG. 3 shows one embodiment of the three-in-one windshield of the present invention in a half-windshield configuration in which the movable/removable upper portion is detached and removed from the fixed lower portion, leaving only the fixed lower portion of the windshield.

FIG. 3 shows one embodiment of the three-in-one windshield of the present invention in a half-windshield configuration in which the movable/removable upper portion is detached and removed from the fixed lower portion, leaving only the fixed lower portion 101 of the windshield. This provides good airflow to the cockpit through open area OA, while eliminating the risk of damage to the upper movable/removable portion or the hood under conditions of extreme/rough use. Portions of hinge assemblies 103 remain on fixed lower portion 101.

Figure 4:
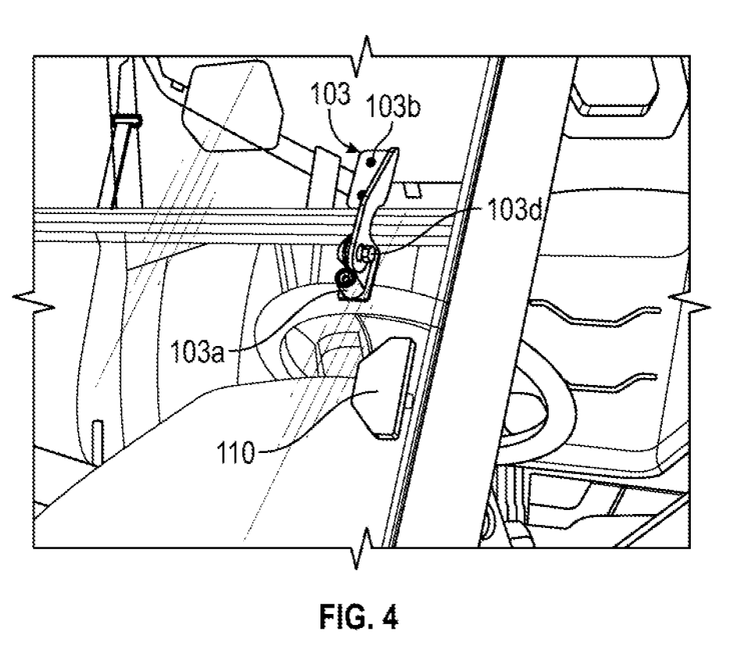
FIG. 4 shows one embodiment of a hinged connection assembly for connecting the movable/removable upper portion of the inventive windshield assembly to the fixed lower portion.

FIG. 4 shows one embodiment of a hinged connection assembly for connecting the movable/removable upper portion of the inventive windshield assembly to the fixed lower portion. The illustrated hinged connection assembly 103 includes a first portion 103*a* that is fixed to the fixed lower portion 101 of the windshield, and a second portion 103*b* that is fixed to the upper movable/removable portion 102 of the windshield. Fixed lower portion 103*a* includes a pivot rod 103*d* that extends through and engages a matching key slot in second portion 103*b*.

Figure 5:
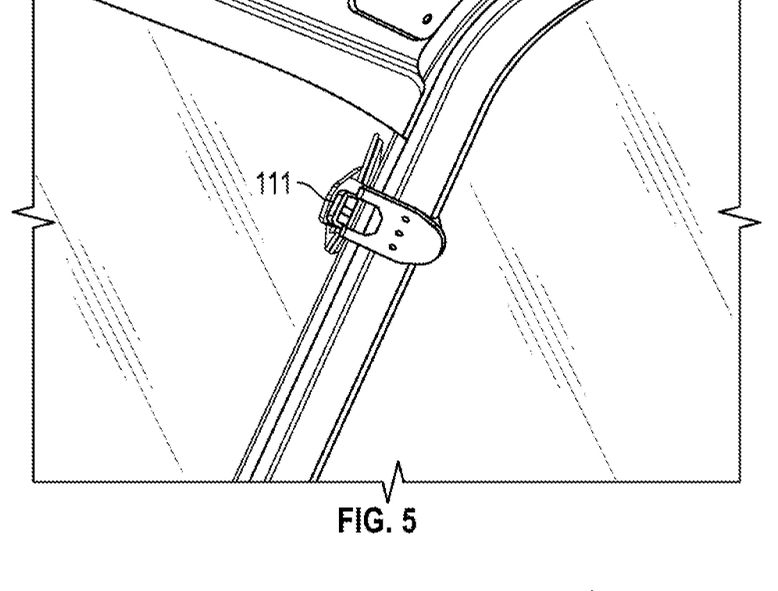
FIG. 5 shows one embodiment of a clip to secure the movable/removable upper portion of the inventive windshield assembly to an A-pillar.

FIG. 5 shows one embodiment of a clip 111 securing movable/removable upper portion 102 to A-pillar 121.

Figure 6:
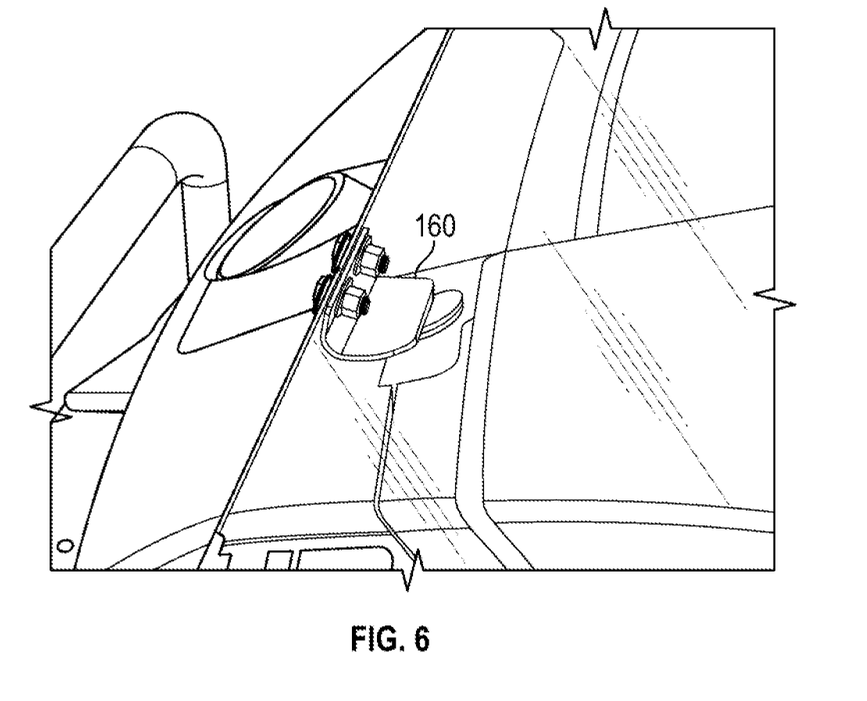
FIG. 6 shows one embodiment of a magnetic connection to magnetically secure the lowered edge of the movable/removable upper portion of the inventive windshield assembly to the vehicle hood.

FIG. 6 shows one embodiment of a magnetic connection 160 effective to magnetically secure the lowered edge of the movable/removable upper portion of the inventive windshield assembly to the vehicle hood.

Figure 7:
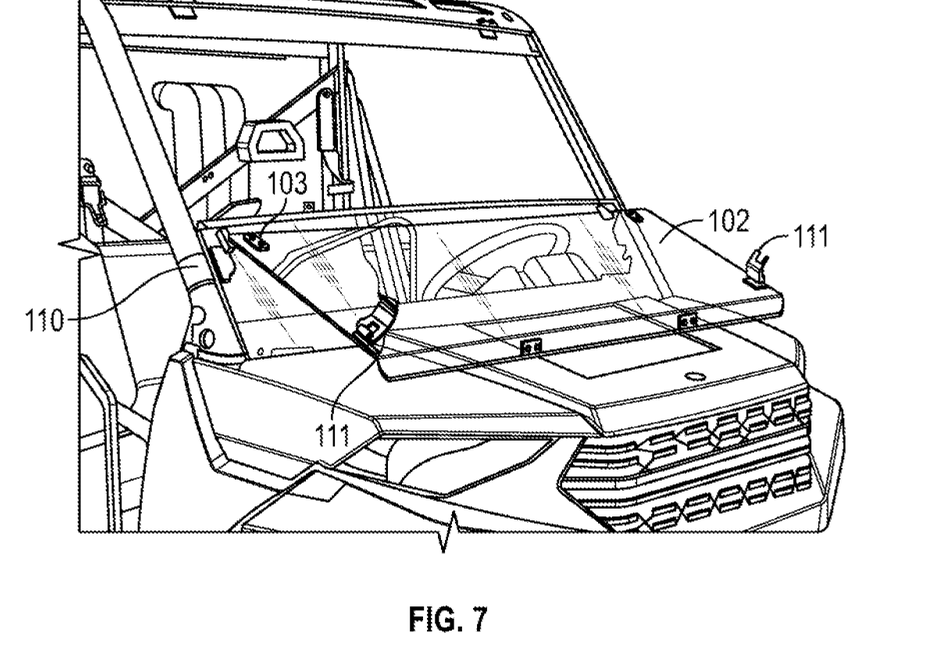
FIG. 7 shows one embodiment of the three-in-one windshield of the present invention in a flipped-down configuration in which the movable/removable upper portion is flipped downward and/or forward from the upper edge of the fixed lower portion to the hood of the vehicle, thus providing airflow into the cockpit.

FIG. 7 further illustrates the three-in-one windshield of the present invention in its flipped-down configuration. Upper movable/removable portion 102 is flipped down over and in front of lower fixed portion 101, and is held by magnetic connection 106 to the vehicle hood. Upper clips 111 and hinge assembly 103 are also shown.

Figure 8:
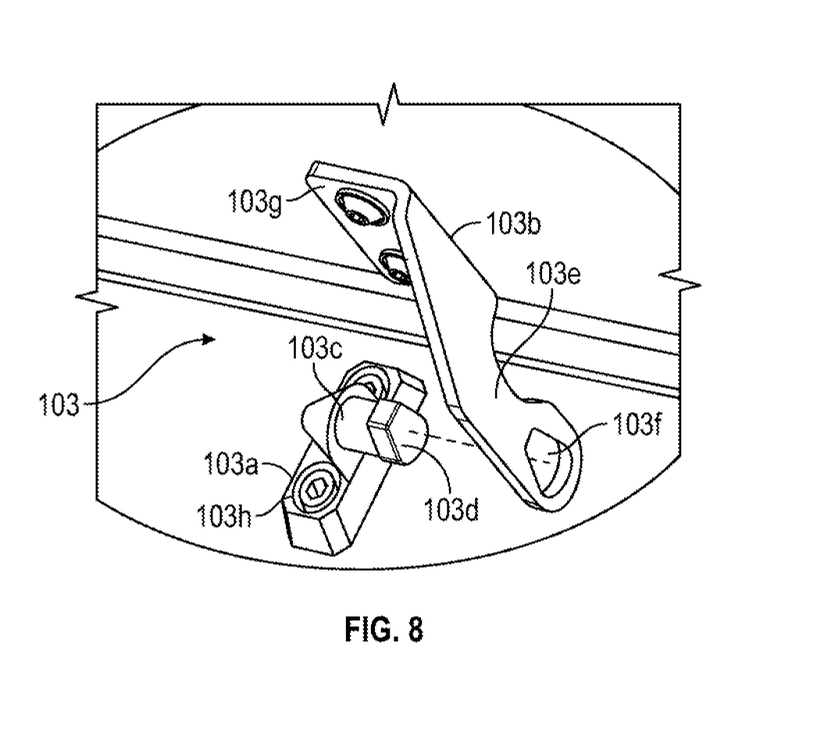
FIG. 8 shows one embodiment of a hinged connection assembly to allow the movable/removable upper portion to be flipped downward and/or forward from the upper edge of the fixed lower portion to the hood of the vehicle.

FIG. 8 shows one embodiment of a hinged connection assembly to allow the movable/removable upper portion to be flipped downward and/or forward from the upper edge of the fixed lower portion to the hood of the vehicle. Hinged connection assembly 103 includes a first portion 103*a* that may be fixed to the fixed lower portion 101 of the windshield, and a second portion 103*b* that may be fixed to the upper movable/removable portion 102. First portion 103*a* includes a pivot rod 103*c* that extends through and terminates in a key end 103*d*, and is mountable to windshield portion 101 with fasteners 103*h*. Second portion 103*b* includes an arm 103*e* that terminates in a key slot 103*f*, and is mountable to windshield portion 102 with fasteners 103*g*. Pivot rod 103*c* and key end 103*d* engage matching key slot 103*f*, allowing engagement and disengagement of the two windshield pieces.

With the illustrated hinge assembly, when the windshield is in either its first, upright configuration in which the movable/removable upper portion extends upward from the upper edge of the fixed lower portion to the top of the vehicle, or its second, flipped-down configuration in which the movable/removable upper portion is flipped downward and/or forward from the upper edge of the fixed lower portion to the hood of the vehicle, the key end 103*d* and the key slot 103*f* are not aligned and the upper windshield portion may not be detached and removed from the lower windshield portion. When the windshield is in a third (preferably intermediate) position, and the key end and the key slot are aligned, the upper windshield portion may be slid sideways and detached/removed from the lower windshield portion.

Figure 9:
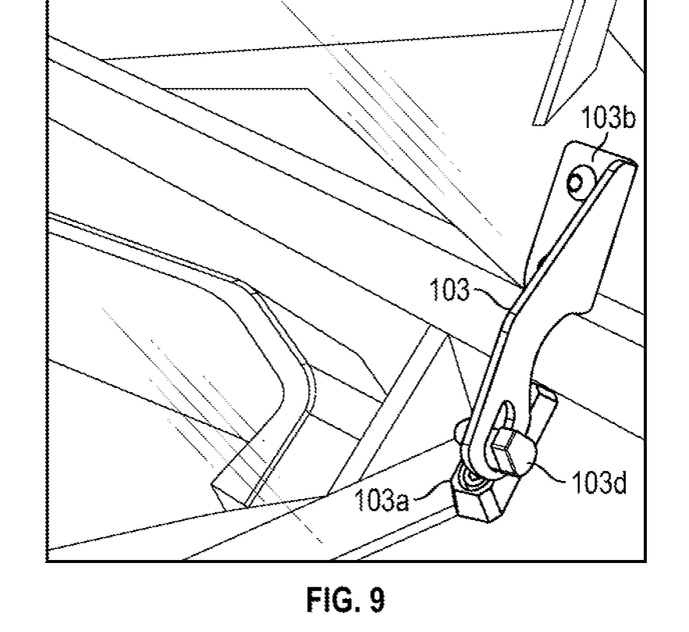
FIG. 9 is another view of a hinged connection assembly that allows the movable/removable upper portion to be flipped downward and/or forward from the upper edge of the fixed lower portion to the hood of the vehicle.

FIG. 9 is another view of a hinged connection assembly 103 that allows the movable/removable upper portion to be flipped downward and/or forward from the upper edge of the fixed lower portion to the hood of the vehicle. hinged connection assembly 103 includes a first portion 103*a* that is fixed to the fixed lower portion 101 of the windshield, and a second portion 103*b* that is fixed to the upper movable/removable portion 102.

Figure 10:
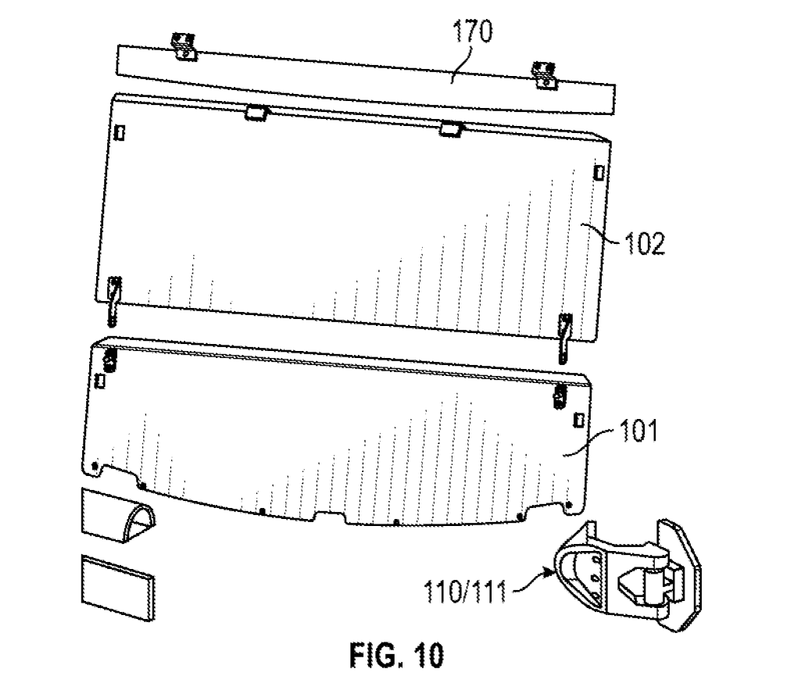
FIG. 10 shows a kit for providing one embodiment of the present invention, including a movable/removable upper portion, a fixed lower portion, a hinged connection assembly to facilitate moving the movable/removable upper portion to its downward-flipped configuration, an upper trim piece to seal the space between the upper portion of the windshield and the vehicle roof, and a clip to secure the movable/removable upper portion of the inventive windshield assembly to an A-pillar.

FIG. 10 shows a kit for providing one embodiment of the present invention. The illustrated kit includes a movable/removable upper portion 102, a fixed lower portion 101, hinged connection pieces 103 to facilitate moving the movable/removable upper portion to its downward-flipped configuration, and an upper trim piece 170 to seal the space between the upper portion of the windshield and the vehicle roof. Clips 110/111 for securing the two windshield portions to an A-pillar may also be included.

Figure 11:
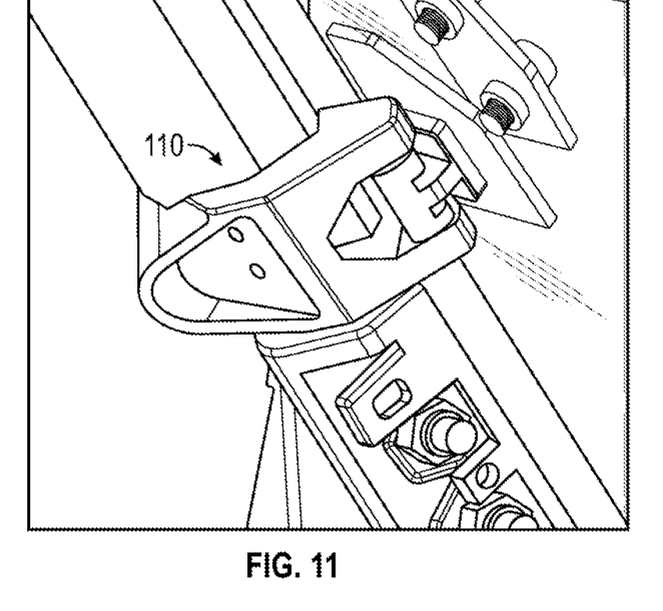
FIG. 11 shows one embodiment of a clip to secure the movable/removable upper portion of the inventive windshield assembly to an A-pillar.

FIG. 11 shows one embodiment of a clip 110/111 for securing the windshield pieces to an A-pillar.

Figure 12:
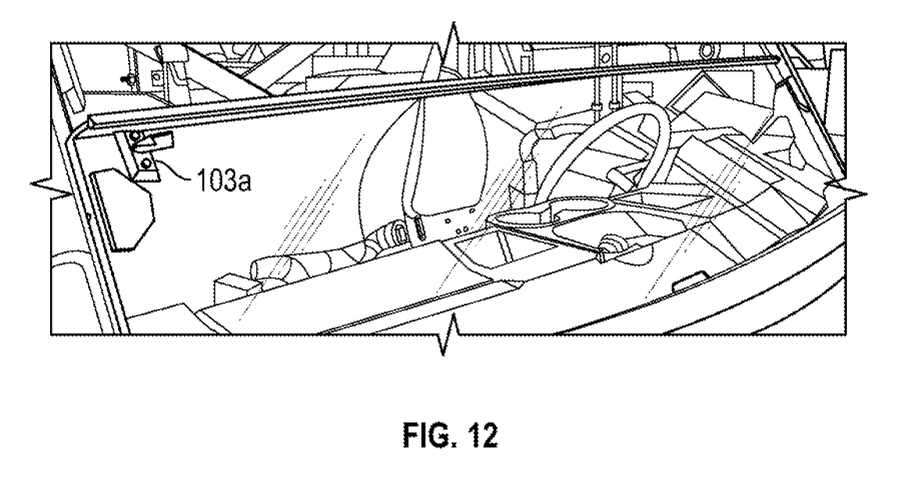
FIG. 12 shows portions of one embodiment of a hinged connection assembly for connecting the movable/removable upper portion of the inventive windshield assembly to the fixed lower portion.

FIG. 12 shows portions of a hinged connection assembly 103 for connecting the movable/removable upper portion of the inventive windshield assembly to the fixed lower portion.

Figure 13:
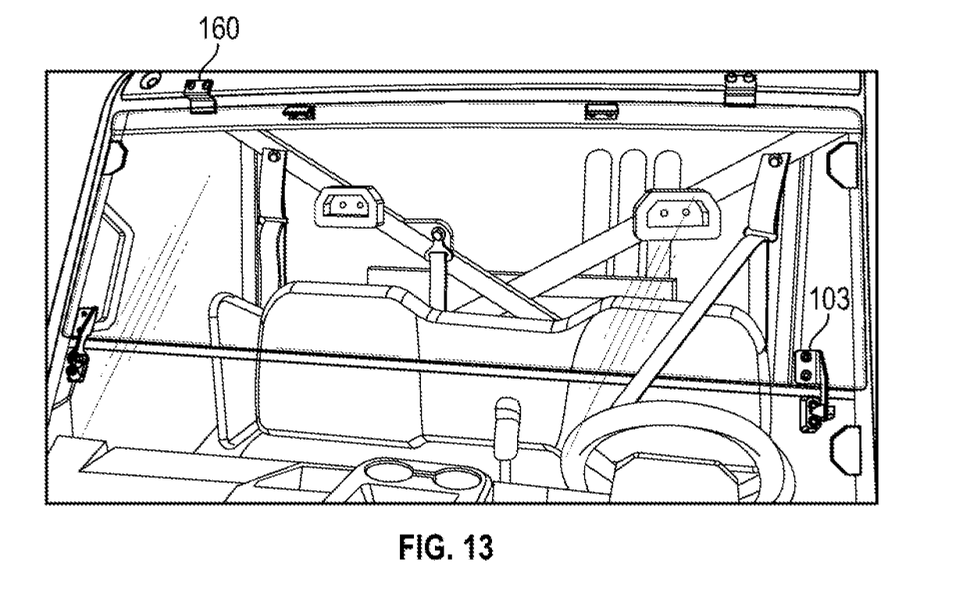
FIG. 13 shows portions of a magnetic connection effective to magnetically secure the lowered edge of the movable/removable upper portion of the inventive windshield assembly to the vehicle hood.

FIG. 13 shows portions of a magnetic connection 160 effective to magnetically secure the lowered edge of the movable/removable upper portion of the inventive windshield assembly to the vehicle hood.

Figure 14:
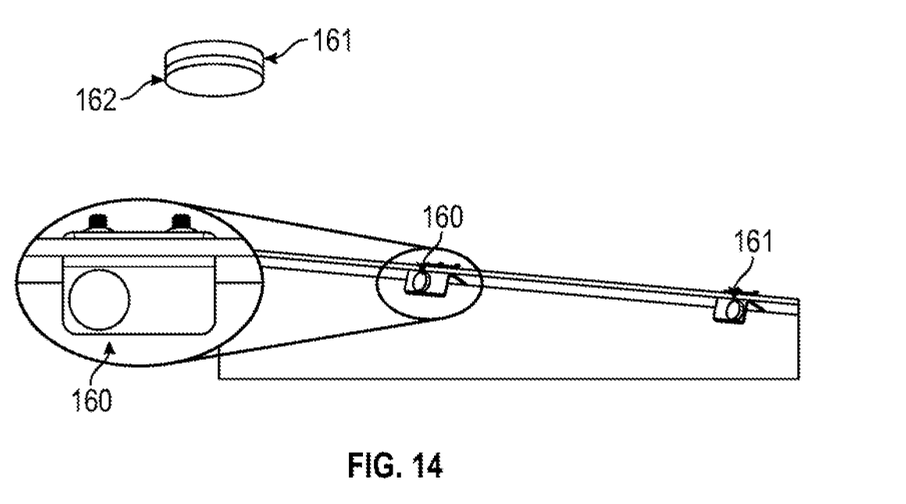
FIG. 14 further illustrates a magnetic connection effective to magnetically secure the lowered edge of the movable/removable upper portion of the inventive windshield assembly to the vehicle hood.

FIG. 14 further illustrates a magnetic connection 160 effective to magnetically secure the lowered edge of the movable/removable upper portion of the inventive windshield assembly to the vehicle hood. Magnetic clip 160 includes a magnet to hold the lowered windshield to the hood of the vehicle, and a foam overlay 162 to prevent damage to the hood when the magnet is engaged.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

Finally, the grammatical device "and/or" (such as in "A and/or B") is used in this disclosure to mean A alone, or B alone, or both A and B.

The invention claimed is:

1. A windshield assembly for an off-road vehicle having a hood, a roof, and a cockpit, the assembly comprising:
   a) an upper windshield member; and
   b) a lower windshield member;
   wherein the upper and lower windshield members may be configured without tools to adopt any one of three configurations;
   wherein the first of the three configuration is a full windshield configuration in which the windshield assembly extends substantially from the hood of the vehicle to the roof of the vehicle, thus providing full coverage for the cockpit;
   wherein the second of the three configuration is a flip-down configuration in which the upper windshield member of the windshield assembly is flipped downward and/or forward, thus providing airflow into the cockpit;
   wherein the third of the three configuration is a half windshield configuration in which the upper windshield member of the windshield assembly has been detached and removed from the lower windshield member, thus leaving only a half windshield to protect the cockpit.

2. A windshield assembly according to claim 1, wherein:
   a) the lower windshield member comprises a fixed lower portion; and b) the upper windshield member comprises a movable upper portion, wherein the movable upper portion is movable from:
   i) a first, upright position in which the movable upper portion extends upward from an upper edge of the fixed lower portion to a top of the vehicle, thus providing full coverage for the cockpit, to
   ii) a second, flipped-down position in which the movable upper portion is flipped downward and/or forward from the upper edge of the fixed lower portion to the hood of the vehicle, thus providing airflow into the cockpit, to
   iii) a third, removed position in which the movable upper portion is detached and removed from the fixed lower portion.

3. A windshield assembly according to claim 2, and further including a hinge for facilitating movement of the movable upper portion from the first, upright position to the second, flipped-down position, and for facilitating detachment of the movable upper portion from the fixed lower portion.

4. A windshield assembly according to claim 3 wherein the hinge is adapted to facilitate detachment of the movable upper portion from the fixed lower portion without the need for any tools.

5. A windshield assembly according to claim 4 wherein the hinge comprises a pivot shaft.

6. A windshield assembly according to claim 5 wherein the hinge is adapted to facilitate detachment of the movable upper portion from the fixed lower portion by aligning a key with a keyslot on the pivot shaft, allowing for translation off of the shaft.

\* \* \* \* \*